United States Patent
Shiga et al.

(10) Patent No.: US 6,330,220 B1
(45) Date of Patent: Dec. 11, 2001

(54) VIBRATION PREVENTING MECHANISM AND A DISC APPARATUS HAVING SUCH A VIBRATION PREVENTING APPARATUS

(75) Inventors: Naoto Shiga, Saku; Noriyuki Katoh, Tokyo, both of (JP)

(73) Assignees: Sanyo Seimitsu Co., Ltd, Nagano-ken; Teac Corporation, Tokyo, both of (JP)

( * ) Notice: Subject to any disclaimer, the term of this patent is extended or adjusted under 35 U.S.C. 154(b) by 0 days.

(21) Appl. No.: 09/108,825

(22) Filed: Jul. 1, 1998

(30) Foreign Application Priority Data

Jul. 3, 1997 (JP) .................................................. 9-178372

(51) Int. Cl.[7] .................................................. G11B 23/00
(52) U.S. Cl. .................................................. 369/263
(58) Field of Search .................................... 369/263, 266; 310/67 R

(56) References Cited

U.S. PATENT DOCUMENTS

| 3,854,347 | * | 12/1974 | Hellerich | 360/137 |
| 4,060,009 | * | 11/1977 | Wyman | 74/573 R |
| 5,111,713 | * | 5/1992 | Cameron et al. | 74/573 R |
| 5,280,828 | * | 1/1994 | Reynoso et al. | 188/184 |
| 5,386,163 | * | 1/1995 | Heilman | 310/261 |
| 5,391,952 | * | 2/1995 | Simazu et al. | 310/67 R |
| 5,860,865 | * | 1/1999 | Smith | 464/180 |
| 6,005,311 | * | 12/1999 | Matsushima | 310/51 |
| 6,205,110 | * | 3/2001 | Miyamoto et al. | 369/266 |

FOREIGN PATENT DOCUMENTS

| 60-154356 | * | 8/1985 | (JP) . |
| 60-215137A | | 10/1985 | (JP) . |
| 63-259242A | | 10/1988 | (JP) . |
| 59-210565 | * | 11/1994 | (JP) . |

* cited by examiner

Primary Examiner—David Davis
(74) Attorney, Agent, or Firm—Anderson, Kill & Olick, P.C.

(57) ABSTRACT

In a disc apparatus using a disc as an information recording medium, a vibration caused by an uneven distribution of weight of a rotational member can be prevented. A motor for rotating a turntable of the disc apparatus has a rotor. A plurality of weights are provided in the rotor, the weights being displaced by a vibration generated in the motor due to a rotation of the rotor. The plurality of weights are rotatably provided in an annular space having a center coinciding with a rotational axis of the rotor.

10 Claims, 14 Drawing Sheets

FIG. 4
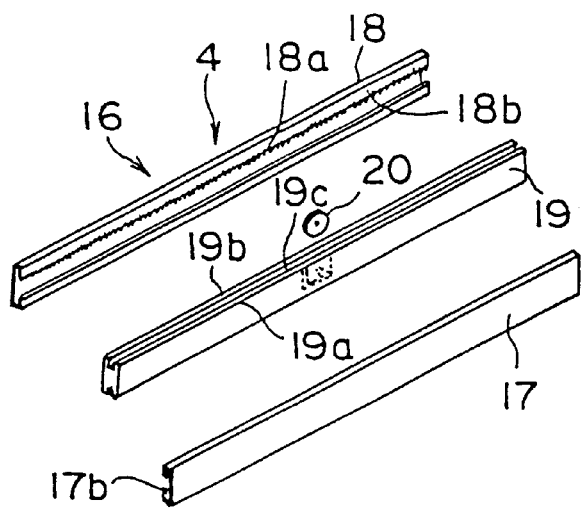
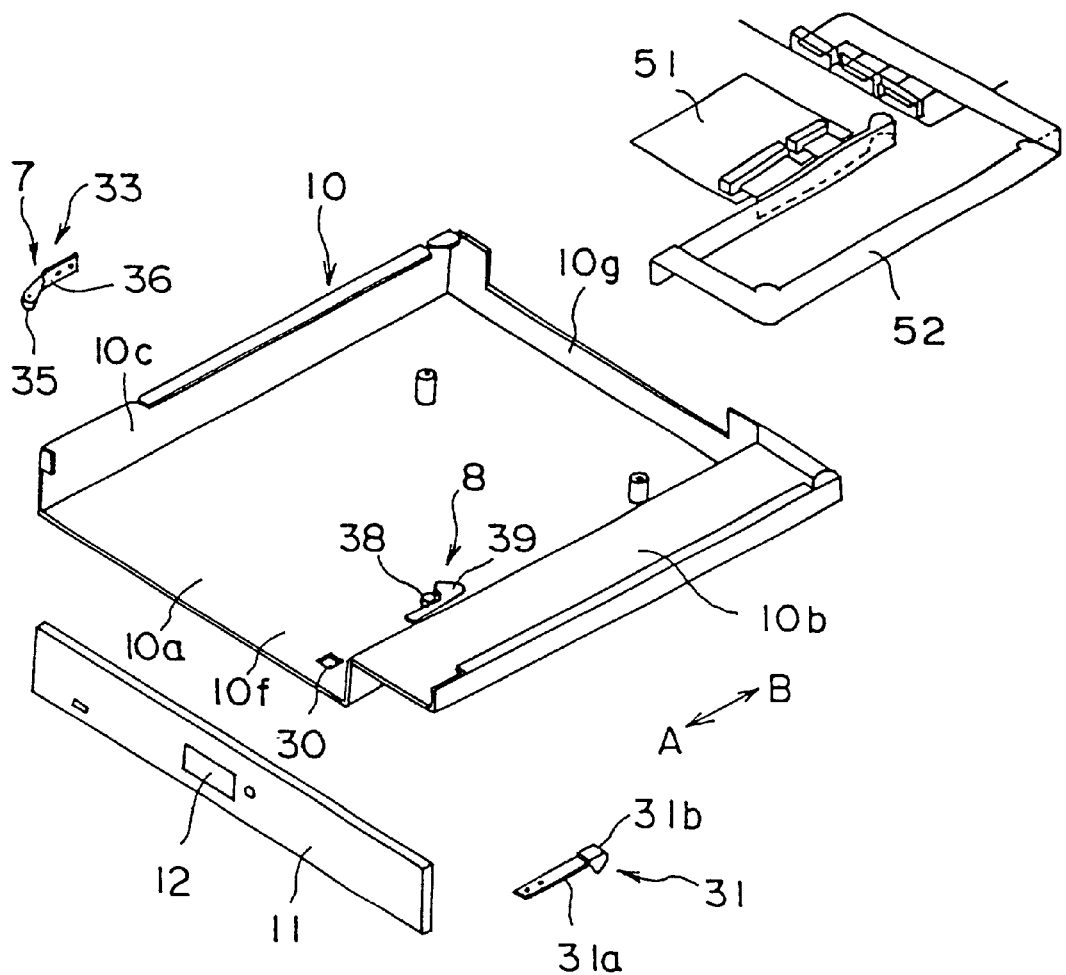

VIBRATION PREVENTING MECHANISM AND A DISC APPARATUS HAVING SUCH A VIBRATION PREVENTING APPARATUS

BACKGROUND OF THE INVENTION

1. Field of the Invention

The present invention relates to a vibration preventing mechanism for a motor for rotating a turntable to which a disc is attached for reading information recorded on the disc and a disc apparatus using such a vibration preventing apparatus.

2. Description of the Related Art

A compact disc (having a diameter of 12 cm or 8 cm) which is reproduced by a laser pick-up is used as a recording medium for storing information such as database or software. In order to incorporate a disc apparatus using such a recording medium into a notebook-type personal computer having a reduced size, a built-in type CD-ROM drive unit which is incorporated into a housing of the notebook-type personal computer.

In a conventional apparatus, a tray on which a disc is placed is driven by a motor. That is, when the tray is moved outside a housing, a disc is placed on the turntable of the tray and, then, the tray is returned inside the housing by a drive force of the motor.

Reduction in size and thickness of a disc apparatus has been achieved by reducing not only the size of the tray and a driving mechanism for driving the tray but also the size of a pickup and the motor for rotating a turntable on which the disc is placed. Accordingly, a supporting structure for a rotational shaft of a motor for driving the turntable and the supporting structure for transmitting a torque to the rotational shaft receive an influence of the reduction in thickness.

In such a conventional disc apparatus, a rotational speed of the disc is increased up to twelve times or even sixteenth times faster than a standard speed so as to quickly read data (information) recorded on the disc. If the disc is rotated at such a high speed, a vibration is easily generated due to a center of gravity being slightly displaced from the center of rotation since a strength of supporting structures of the rotational shaft and a rotor in the motor for rotating the turn table is reduced.

For example, if the center of gravity of the disc is displaced from the center of rotation due to a displacement of a center hole or an uneven distribution of printing ink provided on a surface of the disc, a vibration is generated when the disc is rotated at a high speed. Such a vibration generated in the disc is transmitted to a pickup via the turntable and, thereby, the information recorded on the disc cannot be read by the pickup. In such a case, a control unit of the disc apparatus has to reduce the rotational speed of the motor for driving the turntable which results in a reduction in the reading speed.

Accordingly, there is a problem in that the reading speed cannot be increased even when the rotational speed of the disc can be increased twelve times or sixteen times faster than the standard speed since the rotational speed of the disc is decreased to a speed at which a vibration is not generated.

Additionally, if the vibration of the disc is transmitted to a base which supports the motor via the turntable and the motor, the vibration may be transmitted also to a housing of the notebook-type personal computer. Thus, there is a problem in that such a vibration provides an unpleasant feel to an operator or a movable part such as a tray vibrates, which results in generation of a rattling noise.

SUMMARY OF THE INVENTION

It is a general object of the present invention to provide an improved and useful vibration preventing mechanism for a motor and a disc apparatus using such a vibration preventing mechanism.

A more specific object of the present invention is to provide a vibration preventing mechanism for a motor which prevents generation of a vibration caused by an uneven distribution of weight in rotational parts including a turntable, and a disc apparatus using such a vibration preventing apparatus.

In order to achieve the above-mentioned objects, there is provided according to the present invention a vibration preventing mechanism for a motor, comprising:

a rotatable rotor provided in the motor; and a plurality of weights provided in the rotor, each of the weights being displaced by a vibration caused by a rotation of the rotor.

According to the above-mentioned invention, if a vibration is generated when the rotor is rotated at a high speed, the vibration of the rotor can be suppressed by the plurality of weights being displaced to positions where the vibration is attenuated.

In the above-mentioned invention, the plurality of weights may rotate about a rotational axis of the rotor. According to this invention, a compact structure can be achieved since the plurality of weights rotate about the rotational axis of the rotor.

Additionally, the plurality of weights may be movably provided in an annular space having a center coinciding with a rotational axis of said rotor. According to this invention, a compact structure can be achieved since the plurality of weights are movably provided in the annular space having the center coinciding with the rotational axis of the rotor. Additionally, if a vibration is generated when the rotor is rotated at a high speed, the vibration of the rotor can be suppressed by the plurality of weights move within the annular space and reach the positions where the vibration is attenuated.

Additionally, the rotor may include a guide surface guiding movement of the plurality of weights. Accordingly, each of the weights can quickly and positively move to the position where the vibration is suppressed.

Additionally, each of the plurality of weights may include a plurality of balls which roll on the guide surface of the rotor. Accordingly, a friction of the weights can be reduced when the weights moves along the guide surface. Thus, the plurality of weights can quickly move to the positions where the vibration is attenuated.

Additionally, there is provided according to another aspect of the present invention a disc apparatus using a disc as a recording medium, the disc apparatus comprising:

a turntable to which the disc is attached;

a motor for rotating the turntable, the motor including a rotor; and a vibration preventing mechanism including a plurality of weights provided in the rotor, each of the weights being displaced by a vibration caused by a rotation of the rotor.

Accordingly, if a vibration generated due to a high-speed rotation of the disc is transmitted to the rotor, the plurality of weights are displaced to positions where the vibration is attenuated so as to suppress the vibration of the rotor, which can increase a speed for reading information recorded on the disc.

Other objects, features and advantages of the present invention will become more apparent from the following detailed description when read in conjunction with the accompanying drawings.

BRIEF DESCRIPTION OF THE DRAWINGS

FIG. 4 is an exploded perspective view of a part of the CD-ROM drive unit shown in FIG. 1;

DETAILED DESCRIPTION OF THE PREFERRED EMBODIMENTS

Figure 1:
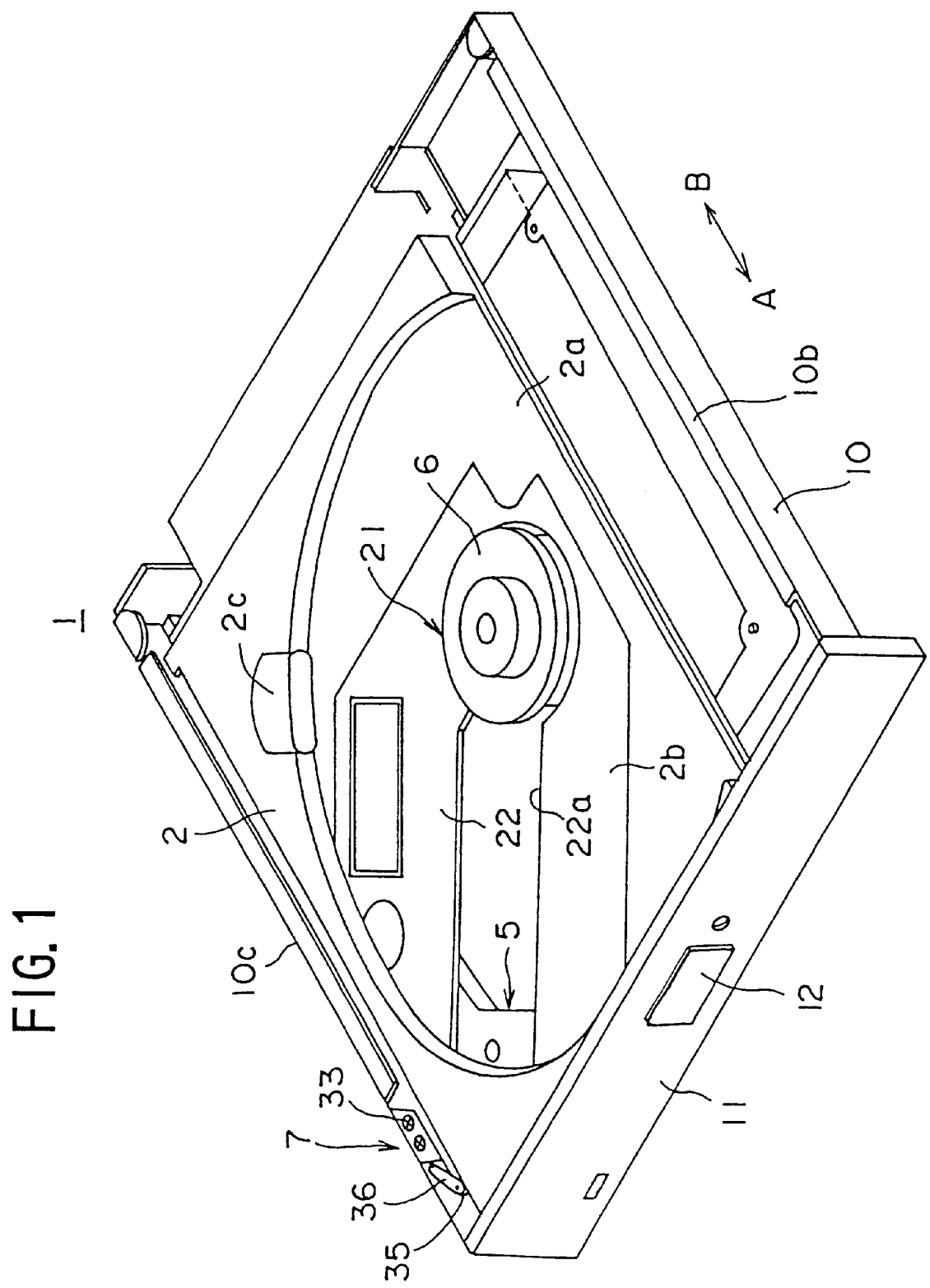
FIG. 1 is a perspective view of a CD-ROM drive unit using a vibration preventing mechanism for a motor according to a first embodiment of the present invention.
Figure 2:
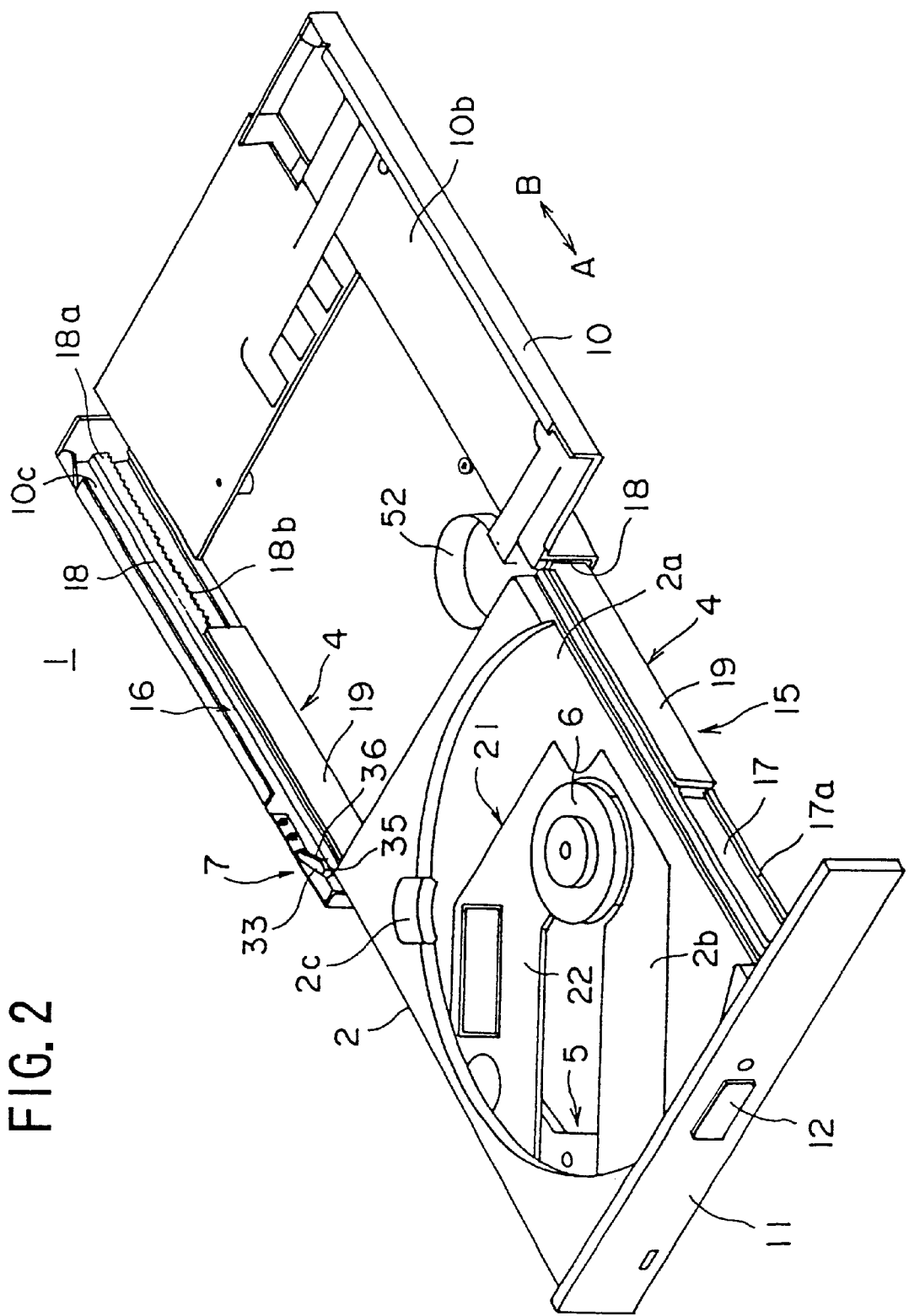
FIG. 2 is a perspective view of the CD-ROM drive unit shown in FIG. 1 in a state in which a tray is drawn out.
Figure 3:
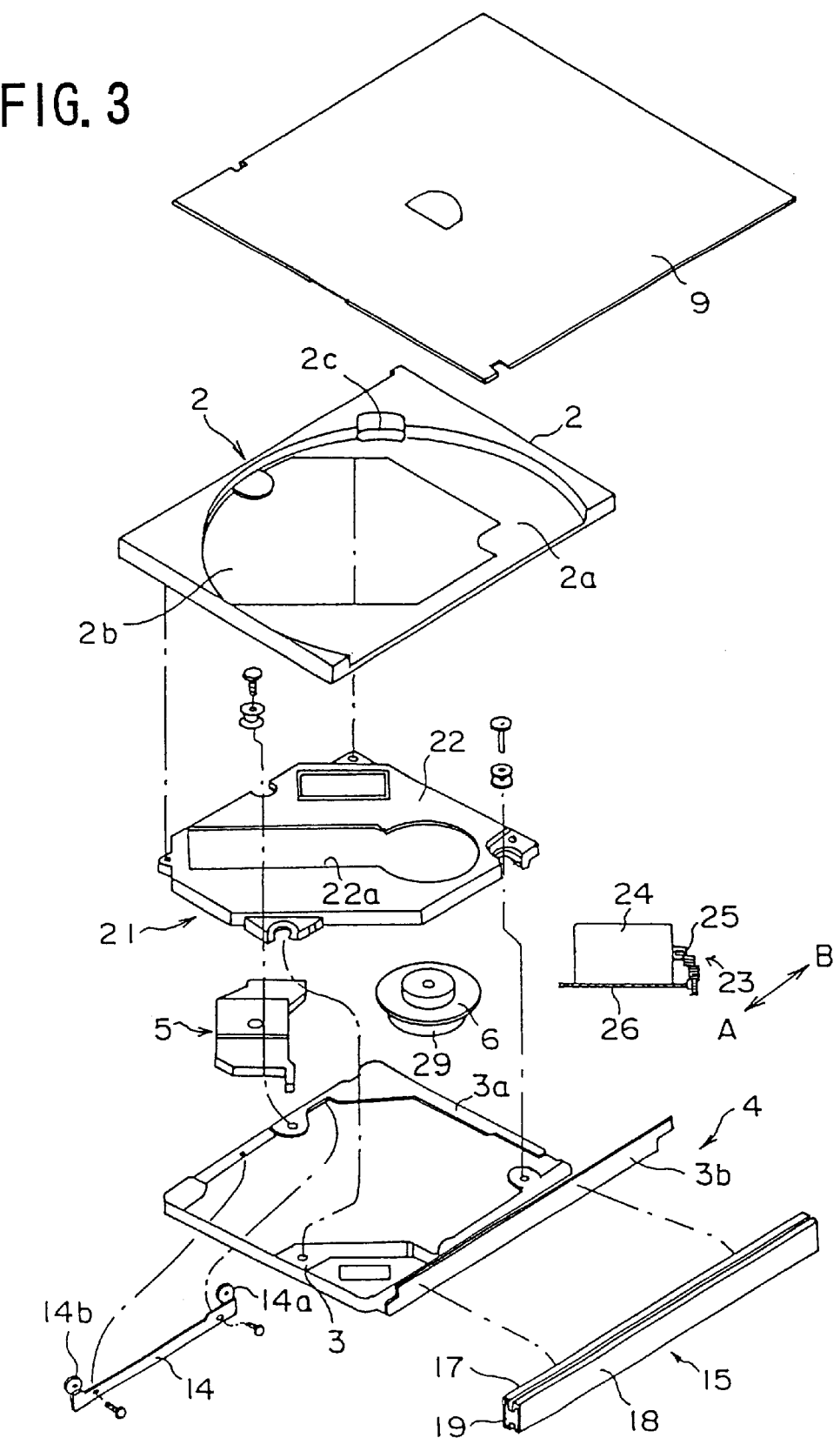
FIG. 3 is an exploded perspective view of a part of the CD-ROM drive unit shown in FIG. 1.

A description will now be given of a first embodiment of the present invention. FIG. 1 is a perspective view of a CD-ROM drive unit according to the first embodiment of the present invention. FIG. 2 is a perspective view of the CD-ROM drive unit in a state in which a tray is drawn out. FIGS. 3 and 4 are exploded perspective views of parts of the CD-ROM drive unit shown in FIG. 1.

As shown in FIGS. 1 to 4, the CD-ROM drive unit 1 (hereinafter referred to as "apparatus 1") is a built-in type apparatus which is incorporated into a housing of a notebook-type personal computer (not shown in the figure).

The apparatus 1 comprises: a tray 2 for receiving a disc (not shown in the figure); a sub-chassis 3 supporting the tray 2; a tray sliding mechanism 4 for slidably supporting the tray 2; an optical pickup unit 5 provided on the sub-chassis 3; a turntable 6 for rotating a disc (CD-ROM) placed thereon; an engaging mechanism 7 for engaging the tray 2 when the tray 2 is moved to a disc changing position; and a locking mechanism 8 for locking the tray 2 when the tray 2 is moved to a disc loading position.

A width of the tray 2 is smaller than a diameter of the disc so that a portion of the disc projects from the tray 2. The tray 2 moves between the disc changing position and the disc loading position by moving in directions indicated by arrows A and B. Accordingly, the apparatus 1 is not provided with a driving mechanism (comprising a motor and a transmission mechanism) for moving the tray 2 in the directions indicated by arrows A and B. Thus, a number of parts of the apparatus 1 is reduced and the apparatus 1 has a reduced size and thickness.

The chassis 10 comprises an accommodating unit 10a which accommodates each of the above-mentioned parts and the cover unit 10b which covers a projected part of the disc on the underside. It should be noted that the underside of the cover unit 10b is provided with an open space so that other units to be incorporated into the apparatus 1 can be provided therein.

The front bezel 11 is fixed to a front end of the tray 2, and moves in the directions indicated by arrows A and B. A switch button 12 is provided in the center of the front bezel 11 so as to release a lock by the locking mechanism when the tray 2 is to be drawn out. Accordingly, when the switch button 12 is turned on in a state shown in FIG. 1, the front bezel 11 projects a distance of 5 to 10 mm (in the direction indicated by the arrow A) so as to facilitate a drawing operation of the tray 2.

As shown in FIG. 3, the tray 2 comprises a disc facing surface 2a which forms a space for receiving the disc; an opening 2b provided in the disc facing surface 2a for the pickup and the turntable; and an arc-like opening 2c into which a finger is inserted when the disc placed on the disc facing surface is removed. A width of the disc facing surface 2a is smaller than a diameter so as to cover the accommodating unit 10a of the chassis 10. The disc facing surface is formed to cover about two-third of the disc. Additionally, since the opening 2c is provided not in the left or right side of the tray but a free space on a corner of the tray 2, the size of the tray 2 is minimized. Accordingly, the width of the tray 2 is greatly reduced and the tray 2 is much smaller than that of the conventional apparatus and, thus, the apparatus 1 can be miniaturized. As mentioned above, the width of the accommodating unit 10a of the chassis is also reduced, and the cover unit 10b, which protects a part of the disc projecting from the tray 2, protrudes from the accommodating unit 10a.

As shown in FIG. 3, the sub-chassis 3 comprises a frame member 3a on which the tray 2 is placed and has an opening for the pickup and the turntable; a bracket 3b which is provided on the right side of the frame member 3a and extends in the directions indicated by the arrows A and B; and a guide rail pressing member 14 which is mounted by screws on the left side of the frame member 3a. The guide rail pressing member 14 includes a pair of pressing parts 14a and 14b which extend above the frame member 3a.

As shown in FIGS. 3 and 4, the tray sliding mechanism 14 includes a pair of guide rail mechanisms 15 and 16 which are mounted on opposite sides of the sub-chassis 3. Each of the pair of guide rail mechanisms 15 and 16 comprises a movable rail 17 which is fixed on the bracket 3b of the sub-chassis 3; a stationary rail 18 which extends parallel to the movable rail 17; and a slide rail 19 which is provided between the movable rail 17 and the stationary rail 18 so as to engage with both the slide rail 17 and the stationary rail 18.

Each of the movable rail 17 and the stationary rail 18 is formed so as to have a C-shaped cross section, and, thus, has end parts 17a and 18a, respectively. The end part 17a provided on the bottom side of the movable rail 17 is provided with a rack 17b extending in the longitudinal direction thereof. The end part 18a provided on the upper side is provided with a rack 18b extending in the longitudinal direction thereof.

The slide rail 19 is formed to have an H-shaped cross section. The slide rail 19 comprises a first rail 19a which engages with the end part 17a of the movable rail 17; a second rail 19b which engages with the end part 18a of the stationary rail 18; and a groove 19c which is formed between the first rail 19a and the second rail 19b. A pinion 20 is rotatably provided in the groove 19c of the slide rail 19 in a middle position of the longitudinal direction. An upper portion and a lower portion of the pinion 20 engage the movable rail 17 and the racks 17b and 18b of the stationary rail 18, respectively.

Figure 11:
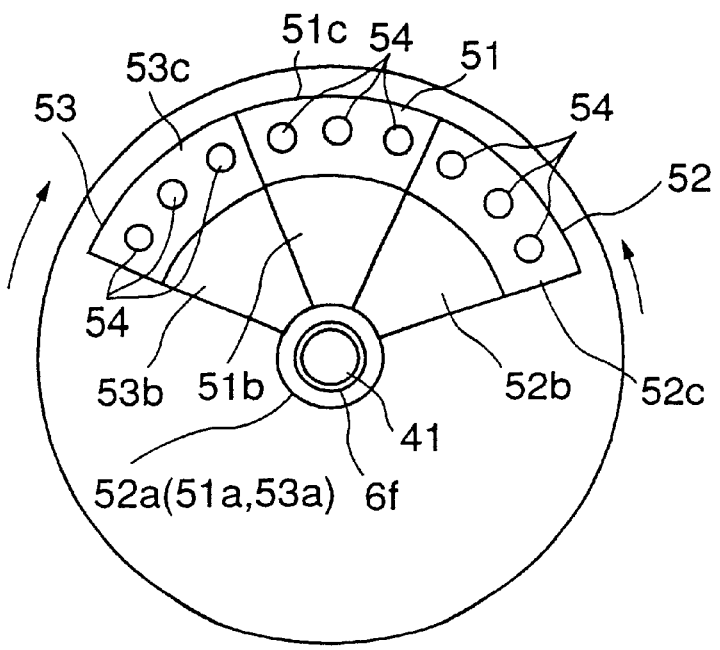
FIG. 11 is a plan view of the vibration preventing mechanism in a state in which a vibration is suppressed.

In the guide rail mechanism 15, the movable rail 17 is mounted on a side wall of the chassis 10 by screws, and the stationary rail 18 is mounted by screws to the bracket 3b of the sub-chassis 3 which supports the tray 2. Accordingly, when the tray 2 is drawn out, the stationary rail 18 slides along the slide rail 19 in the direction indicated by the arrow A and rotates the pinion 20. As the pinion 20 rotates, the slide rail 19 moves relative to the guide rail 19 in the direction indicated by arrow A. Additionally, as shown in FIG. 11, the movable rail 17 of the guide rail mechanism 16 is mounted to the pressing parts 14a and 14b of the guide rail pressing member 14 provided on the sub-chassis 3. Each of the pressing parts 14a and 14b is formed by bending in a crank-like shape so as to serve as a leaf spring. Accordingly, each of the pressing parts 14a and 14b is bent outwardly when it is secured to the movable rail 17. Thus, the movable rail 17 is pressed toward a direction perpendicular to the moving direction (direction indicated by the arrows A and B) of the tray by an elastic restoring force of the pressing parts 14a and 14b and, thereby, a play in the transverse direction is prevented. Additionally, since the slide rail which is provided between the stationary rail 18 and the movable rail 17 slidably engages both the stationary rail 18 and the movable rail 17, the movable rail 17 can be moved a distance twice the travel of the slide rail 19.

As mentioned above, the tray 2 is slidably guided by the guide rail mechanisms 15 and 16 provided between each side of the sub-chassis 3 and the respective side walls 10c and 10d. Each of the rails 17 to 19 is accommodated in the chassis 10 when the tray 2 is at the disc loading position. When the tray 2 is drawn and moved to the disc changing position, the slide rail 19 moves a predetermined distance in the direction indicated by the arrow A with respect to the movable rail 17 as shown in FIG. 2. At the same time, the movable rail 17 moves substantially the same distance in the direction indicated by the arrow A with respect to the slide rail 19.

Additionally, as shown in FIGS. 2 and 3, a drive unit 26 having the pickup unit 5 and the turntable 6 is provided above the sub-chassis 3. The drive unit 21 comprises a base 22 which is secured to an upper portion of the sub-chassis 3; the pickup unit 5 mounted on the base 22 and a pickup drive unit 23 which moves the pickup 5 in a radial direction of the disc; and the turntable 6 which is mounted on the base 22.

The pickup drive unit 23 comprises a pickup drive motor 24 mounted on a bottom surface of the base 22; a transmission mechanism 25 comprising a plurality of gears; a lead screw 26 which is driven by the motor 24 via the transmission mechanism 25; and a guide shaft 27 which extends parallel to the lead screw 26 and guides the pickup unit 5. Accordingly, the pickup unit 5 faces an opening 22a of the base extending in a radial direction of the disc, and is slidably guided by the lead screw 26 and the guide shaft 27 on both sides.

The pickup unit 5 includes an engaging part 28 which engages a screw part of the lead screw 26, the pickup unit 5 moves in a radial direction of the disc when the lead screw 26 is rotated by a rotation of the pickup drive motor 24. Additionally, since the turntable 6 is provided with a turntable drive motor 29 on the bottom side, the turntable 6 is rotated by the turntable drive motor 29 after the disc is loaded. The turntable drive motor 29 rotates the turntable 6 at a speed twelve times or sixteenth times faster than a standard speed so that data recorded on the disc can be read at a high speed.

As mentioned above, when the disc is rotated at a high speed, a slight displacement of the center of gravity causes generation of vibration. Thus, the turntable 29 is provided with a vibration preventing mechanism 40 which suppresses the vibration.

The engaging mechanism 7 comprises a first engaging member 31 which holds the tray 2 by engaging an engaging hole 30 of the chassis 10 when the tray 2 is moved to the disc changing position shown in FIG. 2 and a second engaging member which holds the tray 2 on the side by engaging a recess of the tray 2 when the tray 2 is moved to the disc loading position.

The first engaging member 31 comprises a leaf spring 31a which is secured to a bottom surface 3d of an end of the bracket 3b and an engaging part 31b provided on an end of the leaf spring 31a. Since the first engaging member 31 is provided on the end of the bracket 3b of the sub-chassis 3, the engaging part 31b can fit in the engaging hole 30 of the chassis 10. Thereby, a movement of the tray 2 is restricted.

The second engaging member 33 comprises a roller 35 rolling on a side wall of the tray 2 and a roller supporting member 36 which rotatably supports the roller 35. The roller 35 rolls on the side wall of the tray 2 when the tray is moved, and restricts the movement of the tray 2 by engaging the recess provided on the side wall when the tray moves to the disc loading position or the disc changing position.

The locking mechanism 8 is provided on the frame member 3a of the sub-chassis 3. The locking mechanism 8 comprises a lock lever 39 which is engaged with an engaging roller 38 provided in a bottom part 10f of the chassis 10 and a solenoid (not shown in the figure) which rotates the lock lever 39 to a locking position or an unlocking position.

A description will now be given of the turntable drive motor 29 and the vibration preventing mechanism 40.

Figure 5:
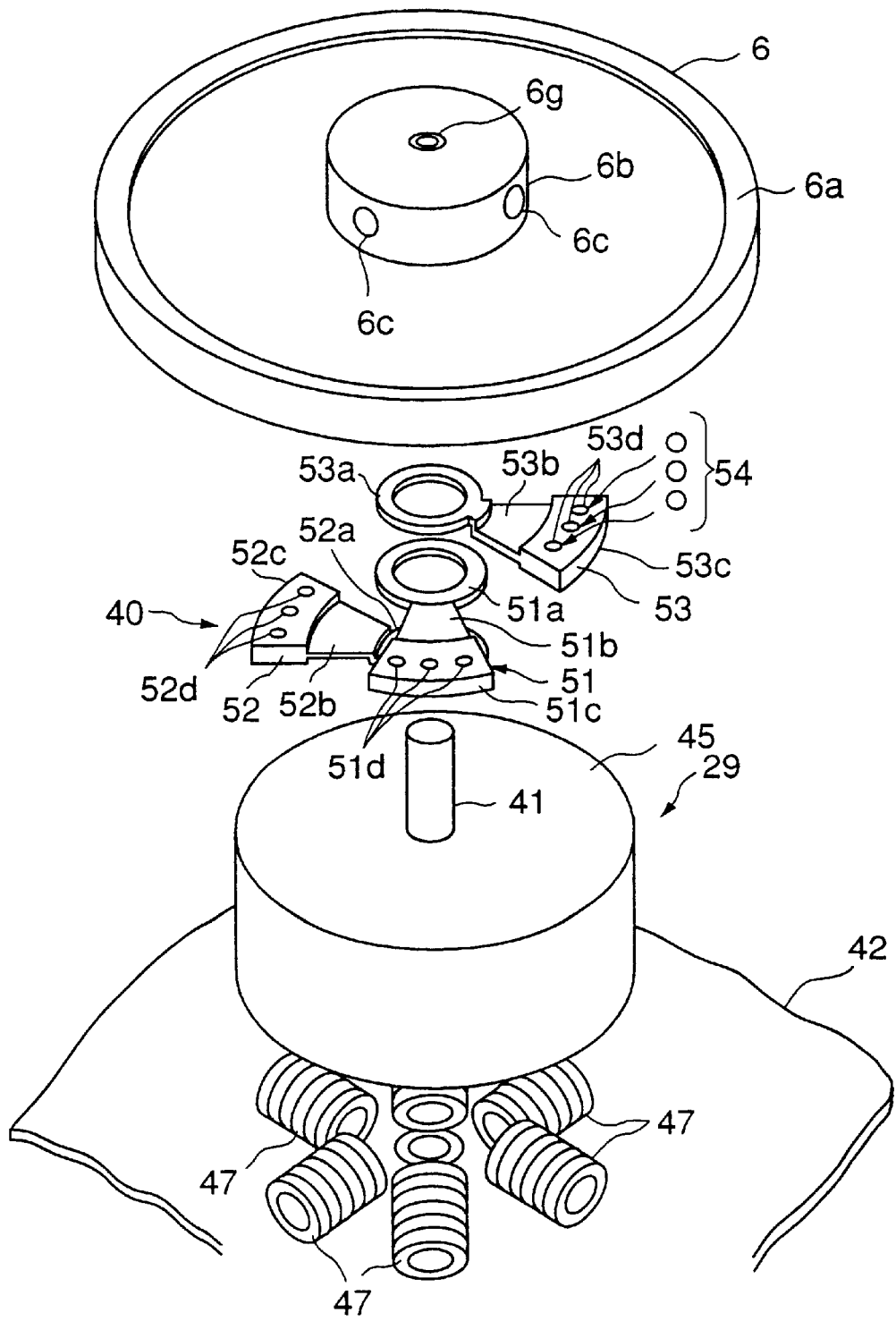
FIG. 5 is an exploded perspective view of a turntable, a turntable driving motor and a vibration preventing mechanism shown in FIG. 1.
Figure 6:
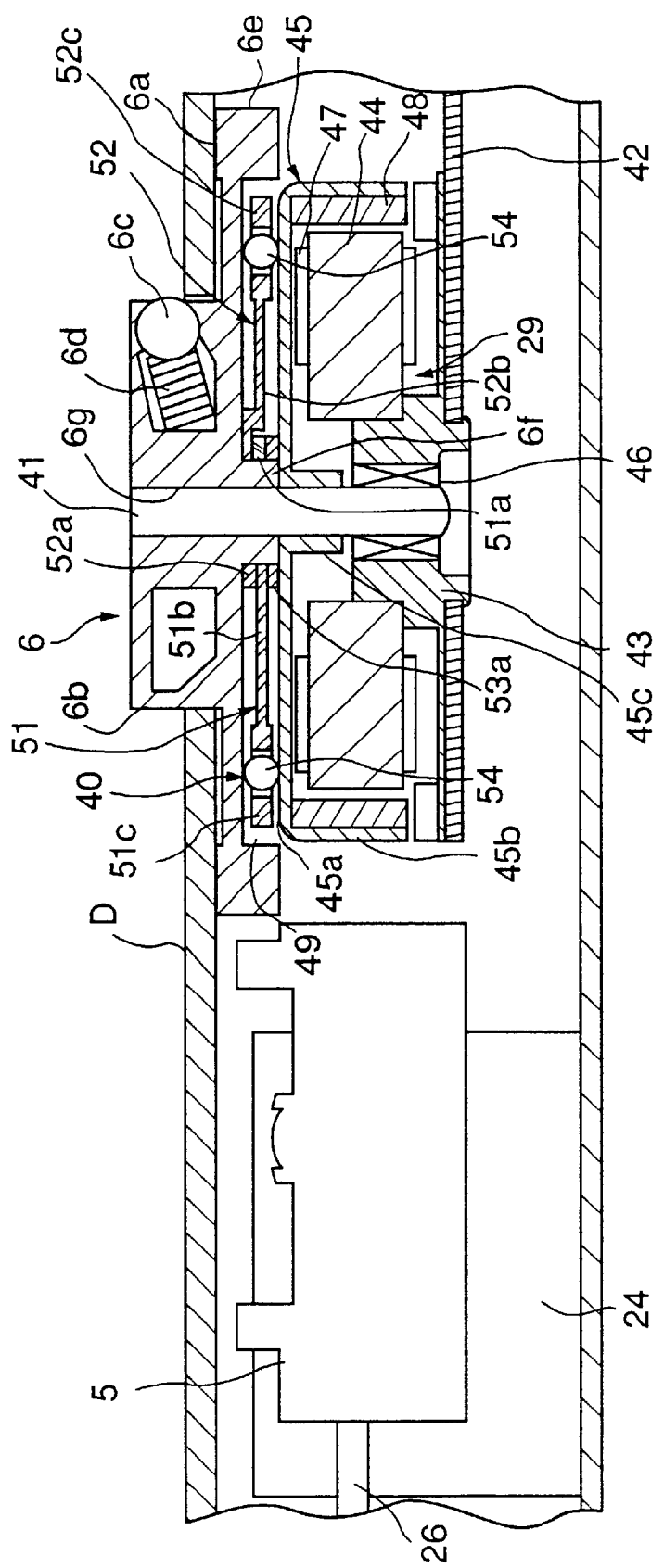
FIG. 6 is a cross-sectional view of the turntable, the turntable driving motor and the vibration preventing mechanism shown in FIG. 5.

FIG. 5 is an exploded perspective view of the turn table 6, the turntable drive motor 29 and the vibration preventing mechanism 40. FIG. 6 is a cross sectional view of an assemble of the turntable 6, the turntable drive motor 29 and the vibration preventing mechanism 40.

As shown in FIG. 5, the turntable 6 is provided with a disc placing surface 6a on which the disc D is placed and a fitting part 6b which fits in an inner circumference of the disc D. A plurality of engaging balls 6c which are movable in radial directions of the disc D are provided inside the fitting part 6b so as to hold the inner circumference of the disc D. Each of the engaging balls 6c is pressed outwardly by a coil spring 6c. Additionally, the turntable 6 includes a projecting part 6e which is protrudingly formed to cover the vibration preventing mechanism 40. A cylindrical part 6f protrudes from the center of the bottom surface of the turntable 6 so that a rotational shaft 41 of the turntable drive motor 29 fits in the cylindrical part 6f. It should be noted that a shaft hole 6g is provided in the center of the cylindrical part 6f and the center of turntable 6, and the rotational shaft 41 tightly fits in the shaft hole 6g. Accordingly, the turntable 6 is rotated together with the rotational shaft 41.

The turntable drive motor 29 comprises a stator 44 mounted on a mounting member 43 fixed on a base 42 and a rotor 45 which is coupled on a middle part of the rotational shaft 41. Additionally, a lower end of the rotational shaft 41 is rotatably supported by a bearing 46 provided in the mounting member 43. The stator 44 is radially provided with a plurality of coils 47 so as to drive the rotor 45. A magnet 48 is provided on an inner wall of the rotor 45 so that the magnet 48 faces the coils 47.

The rotor 45 comprises a disc-like flat part 45a which covers an upper surface of the stator 44; a circumference part 45b which is bent downwardly from a periphery of the flat part 45a so as to support the magnet 48; and a fitting part 45c which extends downwardly from the inner circumference of the flat part 45a and fits on a middle part of the rotational shaft 41.

The vibration preventing mechanism 40 comprises a plurality of weights 51 to 53 slidably mounted on an upper surface of the flat part 45a of the rotor 45. It should be noted that although three weights are provided in the present embodiment, the number of weights may be 2 or 4.

Each of the weights 51 to 53 has the same shape and weight. The weights 51 to 53 comprise ring-like parts 51a to 53a each of which fits to an outer surface of the cylindrical part 6f of the turntable 6; arm parts 51b to 53b each of which extends from the respective ring parts 51a to 53a in a radial direction; and thick parts 51c to 53c each of which is integrally formed with the respective arm parts 51b to 53b on their ends.

The thick parts 51c to 53c are thicker and heavier than the ring-like parts 51a to 53a and the arm parts 51b to 53b. Additionally, small apertures 51d to 53d are provided to the respective thick parts 51c to 53c. A ball bearing 54 is rotatably inserted in each of the small apertures 51d to 53d. The ball bearing 54 is provided to rotate between the flat part 45a of the rotor 45 and the bottom surface of the turntable 6 so as to reduce a friction of the weights 51 to 53 so that a smooth rotation of the weights 51 to 53 is achieved. Additionally, the weights 51 to 53 are accommodated in a disc-like space 49 formed between the turntable 6 and the rotor 45. Thus, the weights 51 to 53 can be provided while a distance between the turntable 6 and the rotor 45 is maintained the same as the conventional apparatus, resulting in reduction of thickness of the apparatus 1.

Additionally, each of the weights 51 to 53 is formed in a sectorial shape as a combination of the arm parts 51b to 53b and the thick part 51c to 53c, and the thick parts 51c to 53c are able to have a large weight. It should be noted that the ring-like parts 51a to 53a are mounted in different positions to each other in the direction of their height.

A description will now be given of a cause of generation of a vibration due to eccentricity of the disc D.

Figure 7:
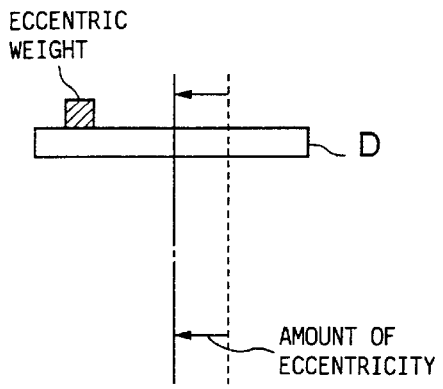
FIG. 7 is an illustration for showing a state of a rotational part having the center of gravity displaced in the leftward direction.
Figure 8:
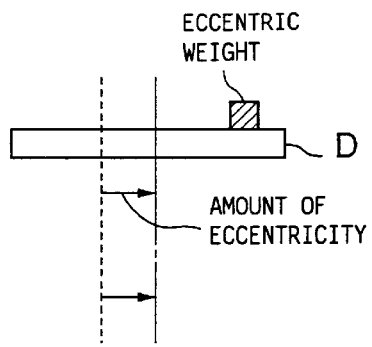
FIG. 8 is an illustration for showing a state of a rotational part having the center of gravity displaced in the rightward direction.
Figure 9:
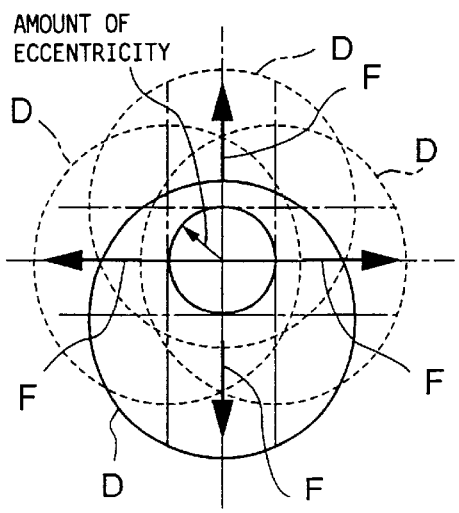
FIG. 9 is a plan view of a rotational part which is eccentrically rotating due to a displacement of the center of gravity.

FIG. 7 is an illustration for showing a rotational member having the center of gravity displaced leftward. FIG. 8 is an illustration for showing a rotational member having the center of gravity displaced rightward. FIG. 9 is a plan view of a rotational member being eccentrically rotated due to a displacement of the center of gravity.

In FIGS. 7 and 8, a dotted line indicates an original center of rotation, and a single dashed chain line indicates a center of rotation displaced due to a displacement of the center of gravity. If the center of gravity of the disc D is displaced as shown in FIGS. 7 and 8, the center of rotation of a rotational member comprising the disc D, the turntable 6 and the rotor 45 is displaced in a direction in which the center of gravity is displaced and, thereby a vibration is generated.

When the rotational member having the above-mentioned displacement of the center of gravity is rotated, the rotational member spins while being revolved since a force F which displaces the rotational member outwardly from the center of rotation is exerted on the rotational member. If such a condition occurs when the rotational member is rotated at a high speed, the disc D, the turn table 6 and the rotor 45 fall in a vibrated state.

A description will now be given of an operation of the vibration preventing mechanism 40.

Figure 10:
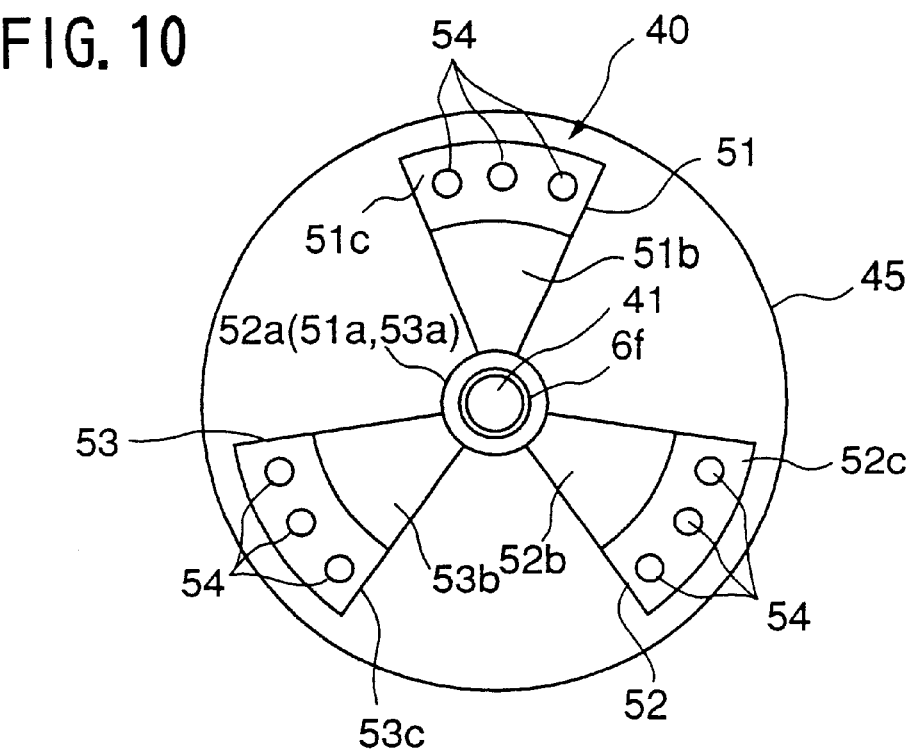
FIG. 10 is a plan view of the vibration preventing mechanism in a state in which there is no vibration.

FIG. 10 is a plan view of the vibration preventing mechanism 40 in a state in which there is no vibration. FIG. 11 is a plan view of the vibration preventing mechanism 40 in a state in which a vibration is suppressed.

As shown in FIGS. 10 and 11, the weights 51 to 53 of the vibration preventing mechanism 40 are rotatably provided between the turntable 6 and the rotor 45. When there is no vibration, the weights 51 to 53 rotate together with the turntable 6 and the rotor 45.

However, when a vibration occurs in the rotor 45 in a radial direction, a force in a circumferential direction is exerted on the weights 51 to 53 so that the weights 51 to 53 are rotated relative to the turntable 6 and the rotor 45. If the center of gravity of the rotor 45 is displaced from the center axis of the rotational shaft 41, the weights 51 to 53 rotate horizontally about the cylindrical part 6f of the turntable 6 on which the ring-like parts 51a to 53a fit. As a result, the center of gravity of the weights 51 to 53 moves to a position symmetric with the center of gravity of the rotational member including the disc D, the turntable 6 and the rotor 45 with respect to a point.

Accordingly, the center of gravity of the rotational member and the center of gravity of the weights 51 to 53 are balanced and, thereby, the center of gravity of the disc D, the turntable 6 and the rotor 45 apparently coincides with the center axis of the rotational shaft 41. Accordingly, the vibration generated in the rotational member (the disc D, the turntable 6 and the rotor 45) is suppressed as the weights 51 to 53 moves relative to the turntable 6 and the rotor 45. The vibration is stopped when the center of gravity of the weights 51 to 53 reaches a position 180 degrees opposite to the center of gravity of the rotational member.

Accordingly, when the rotor 45 vibrates, the thick parts 51c to 53c rotate by operation of the ball bearings 54 to positions 180 degrees opposite to a direction of displacement of the center of gravity of the rotor 45. Thus, the displacement of the center of gravity can be corrected so that the center of gravity of the rotor 45 coincides with the center axis of the rotational shaft 41. Accordingly, the vibration of the rotor 45 is suppressed, and the disc D, the turntable 6 and the rotor 45 are prevented from being vibrated.

Thus, when data (information) recorded on the disc D is read at a high speed by increasing the rotational speed of the disc D to a speed twelve times or sixteenth times faster than the standard speed, a generation of vibration can be prevented even if a strength of rotational shaft 41 of the turntable drive motor 29 or the supporting structure of the rotor 45 is decreased due to reduction in the thickness of the apparatus 1.

For example, even when the center of gravity of the disc D is displaced due to a displacement of the center hole of the disc D or uneven distribution of printing ink on the disc D, the disk D and the turntable 6 can be rotated at a high speed. Additionally, it can be prevented that the information recorded on the disc D cannot be read due to a vibration of the disc D being transmitted to the pickup 5 via the turntable 6.

Accordingly, both the reduction in the thickness of the apparatus 1 and an increase in the reading speed can be achieved at the same time. Thus, information recorded on the disc D can be reliably read at a high speed even when the rotational speed of the disc D is increased to a speed twelve times or sixteenth times faster than the standard speed.

Additionally, since the vibration of the disc D is suppressed by the rotation of the weights 51 to 53, the vibration is not transmitted to the base 42 which supports the motor 29. Thus, for example, it can be prevented that, for example, an unpleasant feel is provided to the operator or a vibration noise is generated due to a vibration transmitted to a housing of a notebook-type personal computer.

Figure 12:
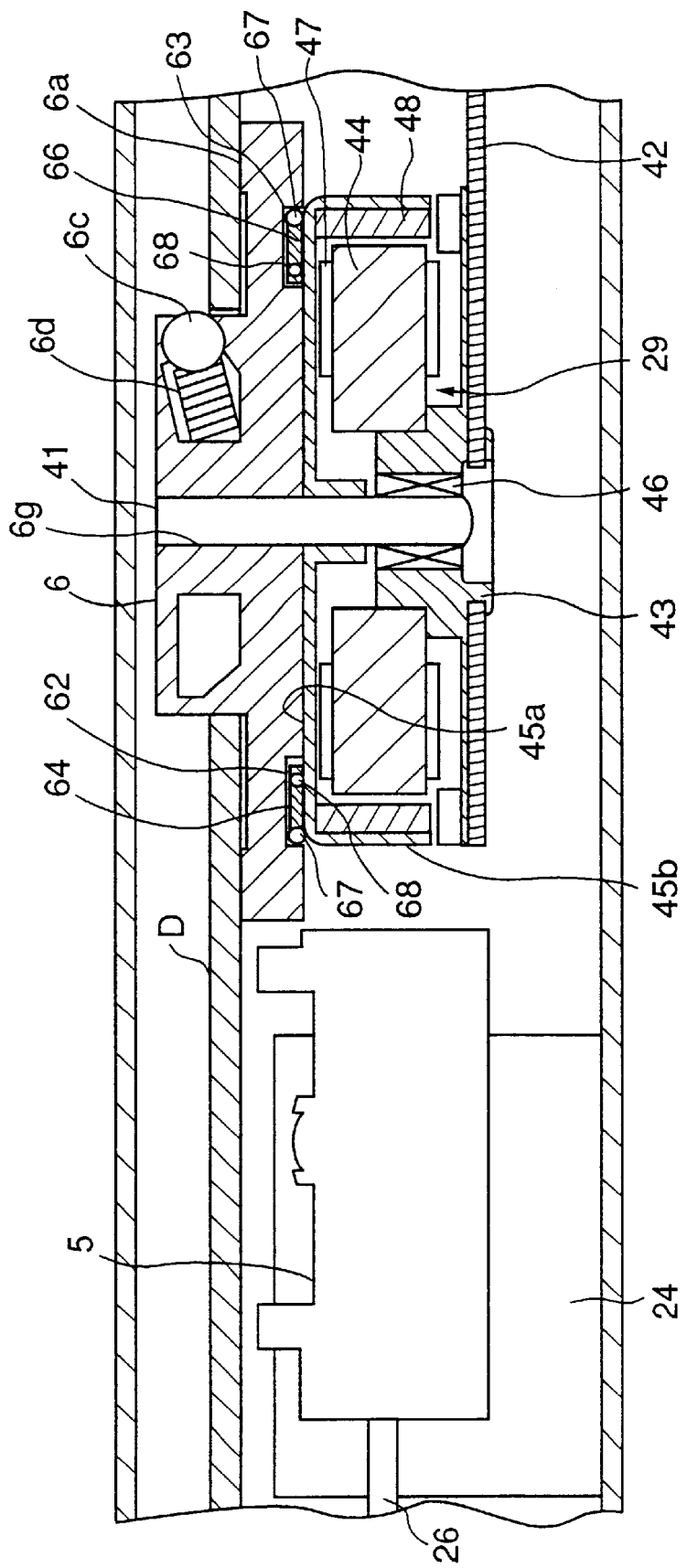
FIG. 12 is a cross-sectional view of a vibration preventing mechanism according to a second embodiment of the present invention.
Figure 13:
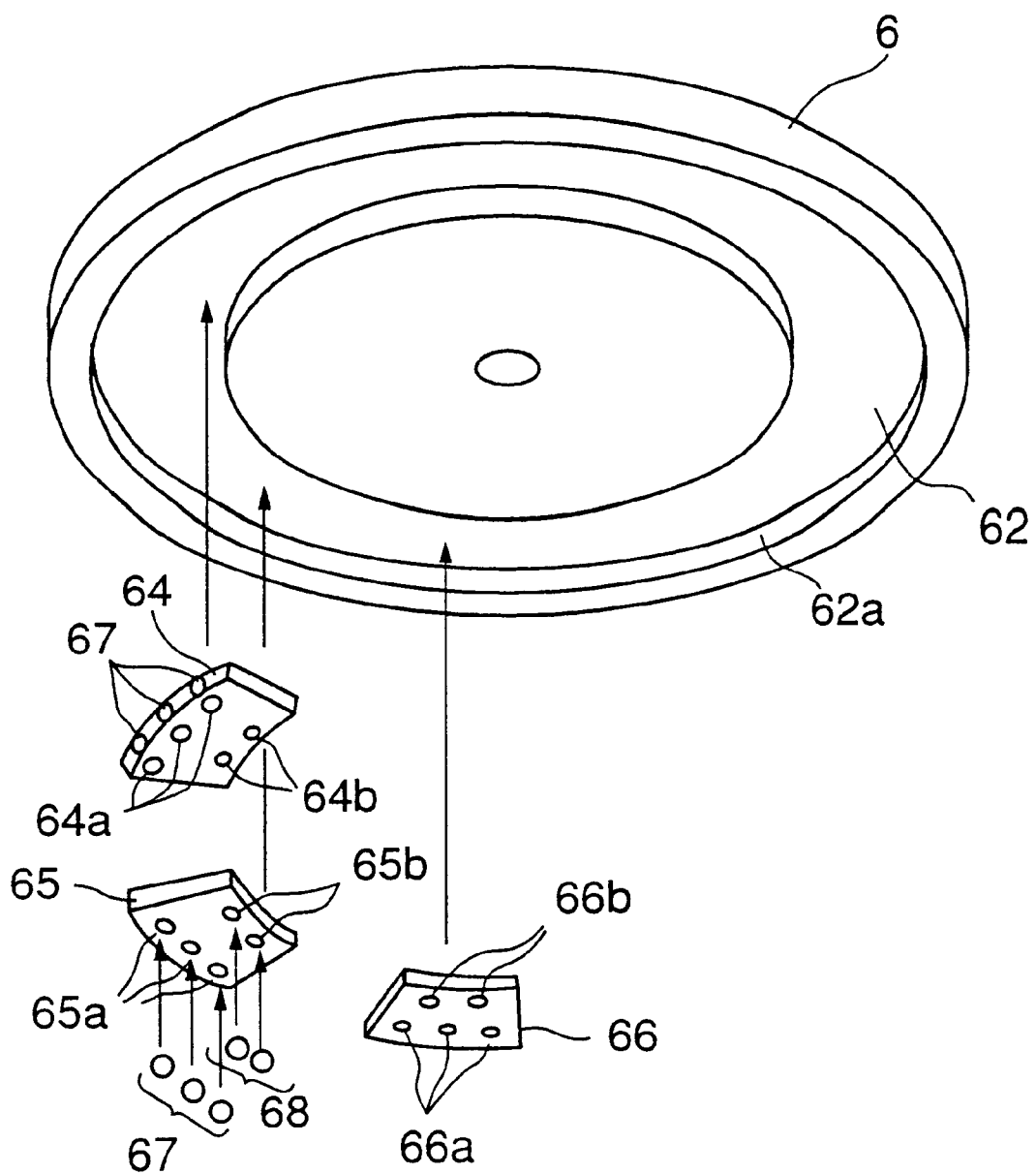
FIG. 13 is an exploded perspective view of the vibration preventing mechanism shown in FIG. 12 when viewed from a bottom side.

A description will now be given of a second embodiment of the present invention. FIG. 12 is a cross-sectional view of a vibration preventing mechanism according to the second embodiment of the present invention. FIG. 13 is a perspective view of the vibration preventing mechanism shown in FIG. 12 when viewed from the bottom side. In FIGS. 12 and 13, parts that are the same as the parts shown in FIG. 6 are given the same reference numerals, and descriptions thereof will be omitted.

A guide groove 62 is provided on the bottom surface of the turntable 6. The guide groove 62 is formed in an annular shape having a center coincident with the center axis of the rotational shaft 41. Additionally, the guide groove 62 is provided at a position where the guide groove faces the flat part 45a of the rotor 45. Accordingly, a space 63 is formed between the guide groove 62 and the flat part 45a of the rotor 45.

Three weights 64 to 66 are accommodated in the space 63. Each of the weights 64 to 66 is formed in a sectorial flat shape corresponding to an inner circumference and an outer circumference of the guide groove 62. The weights 64 to 66 are provided with ball accommodating parts 64a to 66a. In the present embodiment, each of the weights 64 to 66 is provided with three each of the ball accommodating parts 64a to 66a on an outer side, and is provided with two each of ball accommodating parts 64b to 66b on an inner side.

A first ball bearing 67 is accommodated in each of the ball accommodating parts 64a to 66a. Additionally, a second ball bearing 68 is provided in each of the ball accommodating parts 64b to 66b. The second ball bearing serves as an assisting bearing.

A size of the first ball bearing 67 is selected so that a part of the first ball bearing 67 protrudes from both the bottom surface and an outer circumferential surface of each of the weights 64 to 66. A size of the second ball bearing 68 is selected so that a part of the second ball bearing 68 protrudes from the bottom surface of each of the weights 64 to 66. Accordingly, each of the weights 64 to 66 is movably supported by the ball bearings 67 and 68.

The weights 64 to 66 has a sectorial shape which corresponds to the shape of the above-mentioned weights 51 to 53 without the ring-like part 51a to 53a and the arm parts 51b to 53b, the weights 64 to 66 can be fabricated easier than the weights 51 to 53.

Additionally, the weights 64 to 66 are accommodated in the annular space 63 which is formed by the guide groove 62 of the turntable 6 and the flat portion 45a of the rotor 45. Thereby, the weights 64 to 66 are accommodated in the space 63 in a slidable state via the ball bearings 67 and 68.

Figure 14:
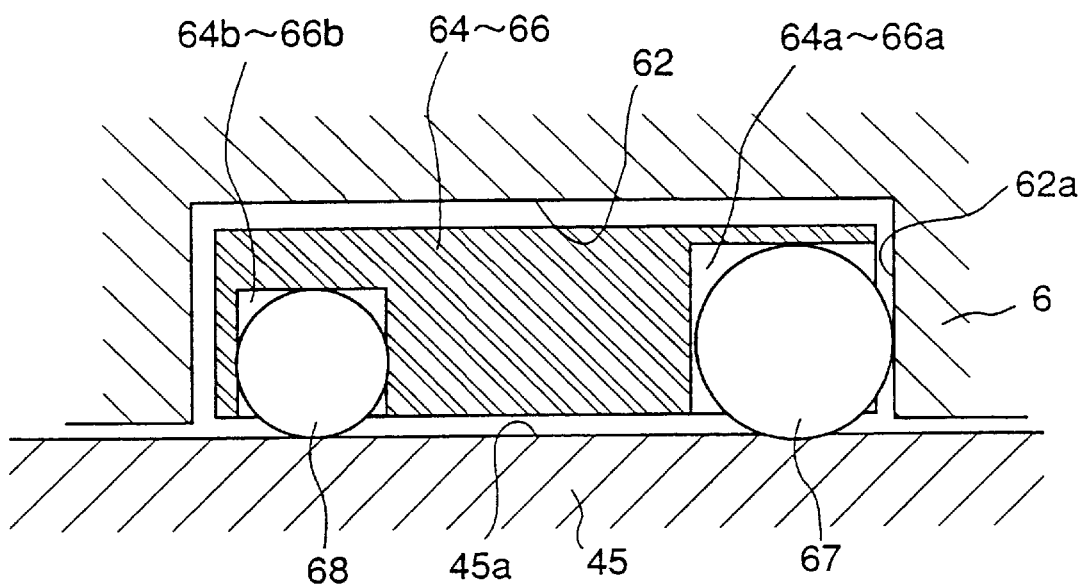
FIG. 14 is a cross-sectional view of a part of a rotor in which weighs are accommodated inside a space.
Figure 15:
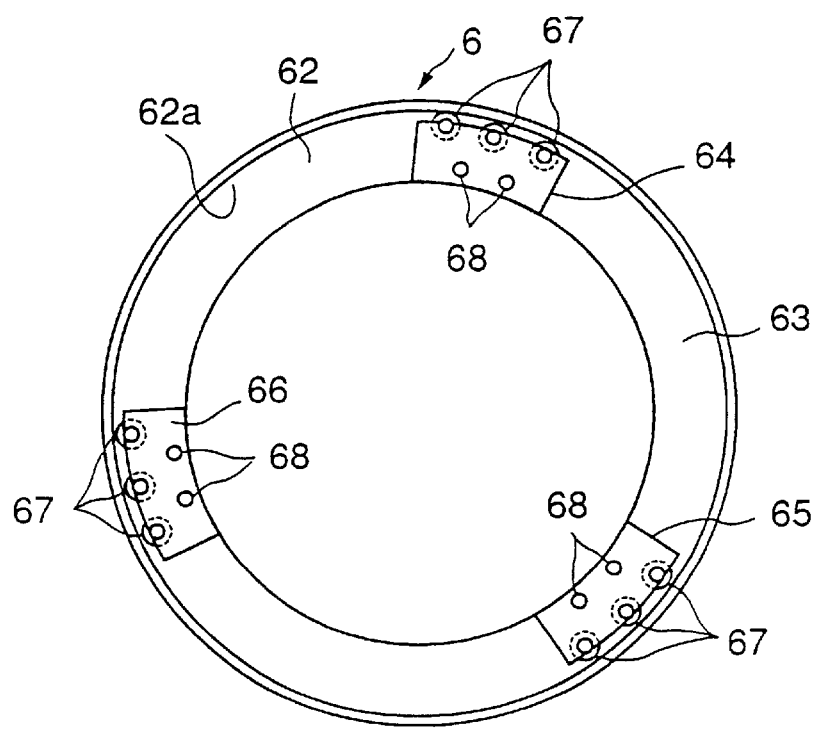
FIG. 15 is a bottom view of the rotor in which weights are accommodated in the space.

FIG. 14 is a cross-sectional view of the space 63 and the weights 64 to 66 accommodated in the space 63. FIG. 15 is a bottom view of the turntable 6 for showing the weights 64 to 66 accommodated in the space 63.

As shown in FIGS. 14 and 15, each of the weights 64 to 66 is accommodated in the space 63 in a state in which the first ball bearings 67 contact the outer wall 62a of the guide groove 62 and the flat part 45a of the rotor 45 and the second ball bearings 68 contact the flat part 45a of the rotor 45. Accordingly, each of the weights 64 to 66 is supported in a horizontal position and a sliding friction is reduced.

Figure 16:
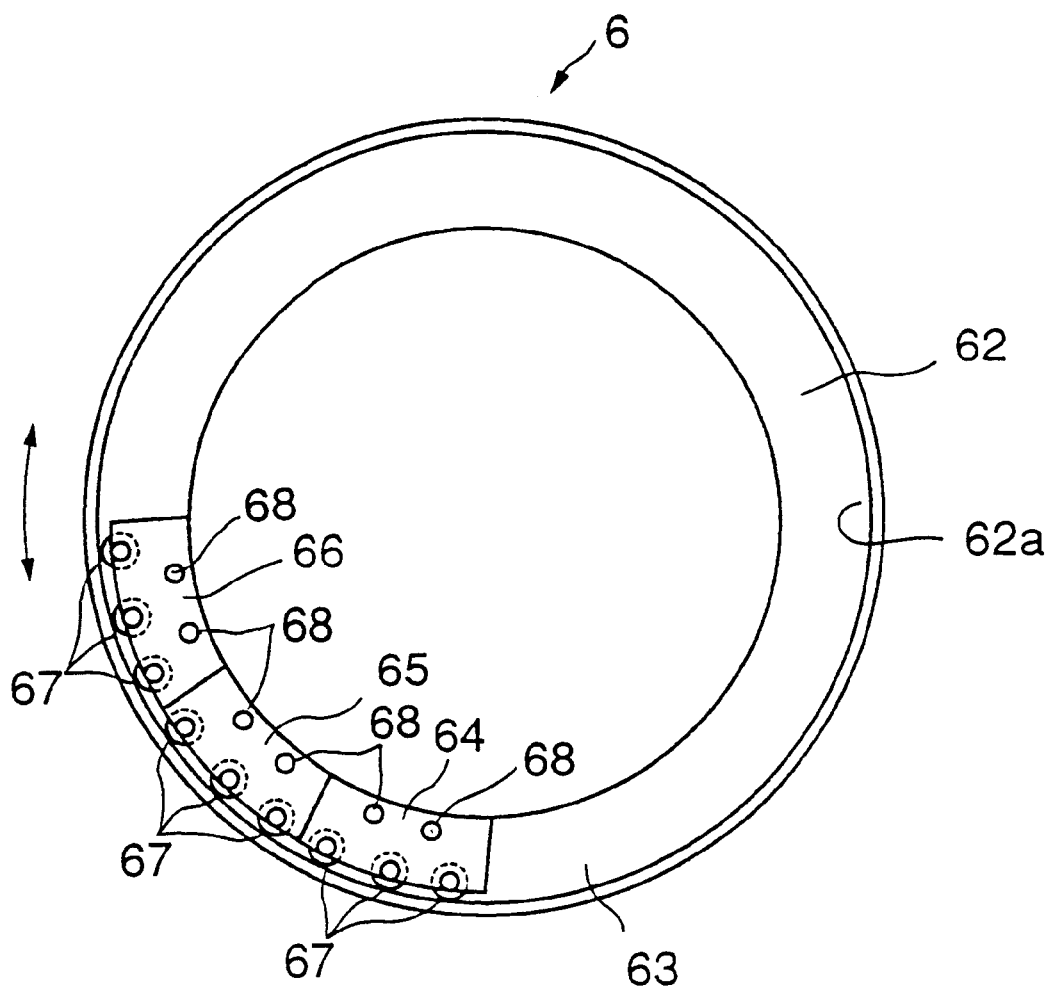
FIG. 16 is a bottom view of the rotor for showing the weights in a state in which a vibration is suppressed.

FIG. 16 is a bottom view of the turntable 6 for showing an operation of the weights 64 to 66 for suppressing a vibration. When a vibration is generated in the rotor 45 in a radial direction, a force is exerted on the weights 64 to 66 to rotate the weights 64 to 66 in a circumferential direction. If the center of gravity of the rotor 45 is displaced from the center axis of the rotational shaft 41, the weights 64 to 66 moves in a circumferential direction while being guided by the guide groove 62. At this time, since each of the weights 64 to 66 can move in the space 63 with a low friction due to the ball bearings 67 and 68, the weights 64 to 66 can quickly move in the circumferential direction when the vibration is generated. As a result, as shown in FIG. 16, the center of gravity of the weights 64 to 66 is displaced to a symmetric position relative to the rotational member comprising the disc D, the turntable 6 and the rotor 45 with respect to a point.

Accordingly, the center of gravity of the rotational member balances the center of gravity of the weights 64 to 66, and the center of gravity of the disc D, the turntable 6 and the rotor 45 apparently coincides with the center axis of the rotational shaft 41. Accordingly, the vibration generated in the rotational member (the disc D, the turntable 6 and the rotor 45) is suppressed as the weights 64 to 66 moves relative to the turntable 6 and the rotor 45. The vibration is stopped when the center of gravity of the weights 51 to 53 reaches a position 180 degrees opposite to the center of gravity of the rotational member.

Accordingly, when the rotor 45 vibrates, the weights 64 to 66 rotate to positions 180 degrees opposite to a direction of displacement of the center of gravity of the rotor 45. Thus, the displacement of the center of gravity is corrected so that the center of gravity of the rotor 45 coincides with the center axis of the rotational shaft 41. Accordingly, the vibration of the rotor 45 is suppressed, and the disc D, the turntable 6 and the rotor 45 are prevented from being vibrated. Thus, when data (information) recorded on the disc D is read at a high speed by increasing the rotational speed of the disc D to a speed twelve times or sixteenth times faster than the standard speed, a generation of vibration can be prevented even if a strength of the rotational shaft 41 of the turntable drive motor 29 or the supporting structure of the rotor 45 is decreased due to reduction in the thickness of the apparatus 1. For example, even when the center of gravity of the disc D is displaced due to a displacement of the center hole of the disc D or uneven distribution of printing ink on the disc D, the disk D and the turntable 6 can be rotated at a high speed. Additionally, it can be prevented that the information recorded on the disc D cannot be read due to a vibration of the disc D being transmitted to the pickup 5 via the turntable 6.

Accordingly, both the reduction in the thickness of the apparatus 1 and an increase in the reading speed can be achieved at the same time. Thus, information recorded on the disc D can be reliably read at a high speed even when the rotational speed of the disc D is increased to a speed twelve times or sixteenth times faster than the standard speed. Additionally, since the vibration of the disc D is suppressed by the rotation of the weights 64 to 66, the vibration is not transmitted to the base 42 which supports the motor 29. Thus, for example, it can be prevented that, for example, an unpleasant feel is provided to the operator or a vibration noise is generated due to a vibration transmitted to a housing of a notebook-type personal computer.

It should be noted that although the weights 64 to 66 are accommodated in the guide groove 62 provided on the bottom of the turntable 6 in the above-mentioned second embodiment, the annular space 63 may be formed by an annular separation or wall having a center coincides with the center axis of the shaft 41.

Figure 17:
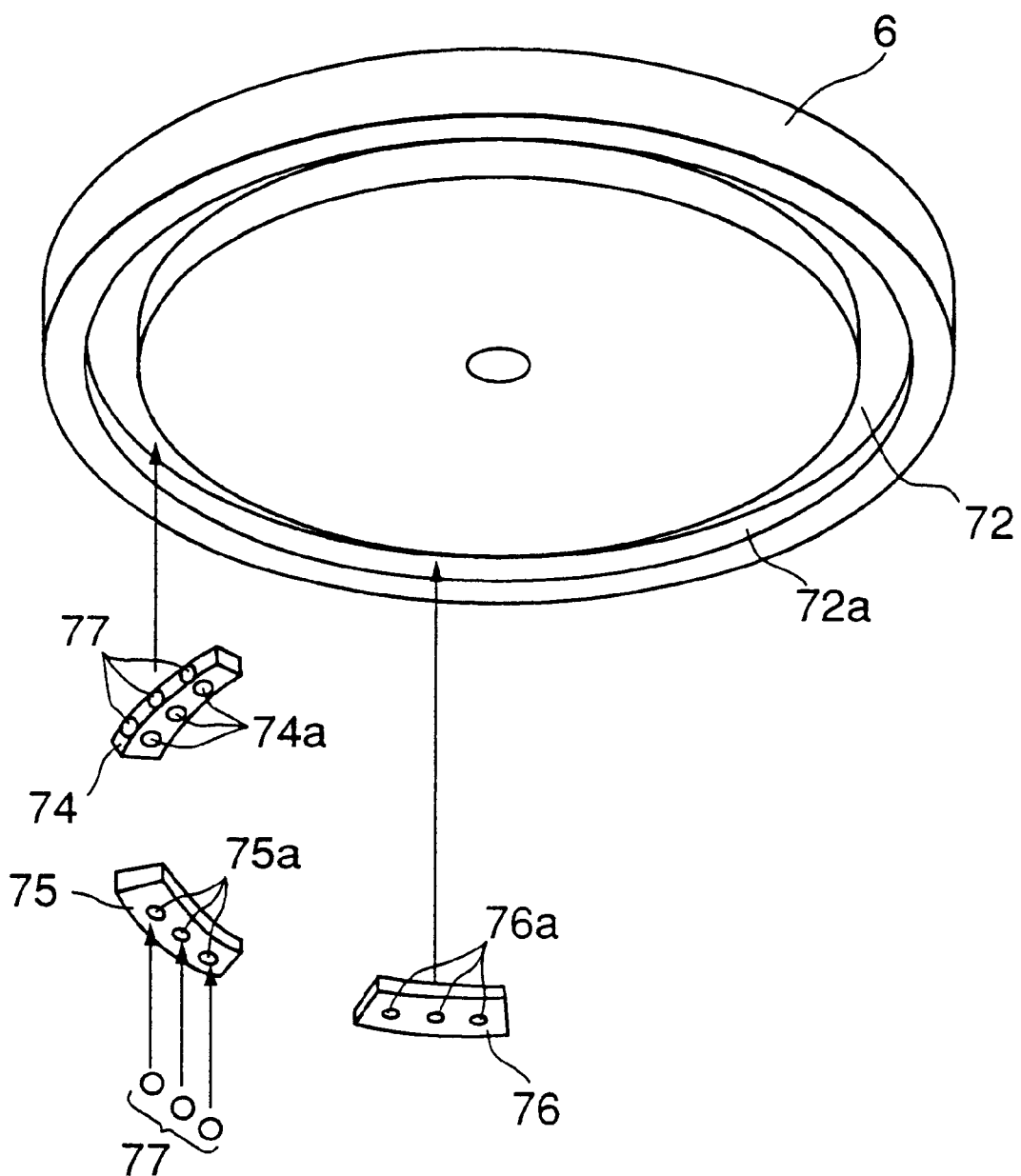
FIG. 17 is an exploded perspective view of a vibration preventing mechanism according to a third embodiment of the present invention.

A description will now be given of a third embodiment of the present invention. FIG. 17 is a perspective view of a vibration preventing mechanism according to the third embodiment of the present invention.

As shown in FIG. 17, a guide groove 72 is provided on the bottom of the turntable 6. The guide groove 72 has a width smaller than the width of the groove 62 of the first embodiment, the width being measured in a radial direction of the turntable. The guide groove 72 is formed in an annular shape having a center coincident with the center axis of the rotational shaft 41. Additionally, an annular space 73 is formed by the guide groove 72 and the flat part 45a of the rotor 45.

Three weights 74 to 76 are accommodated in the space 73. Each of the weights 74 to 76 is formed in a sectorial flat shape having a width corresponding to a width of the guide groove 72. The weights 74 to 76 are provided with ball accommodating parts 74a to 76a. Each of the weights 74 to 76 is provided with three each of ball accommodating parts 74a to 76a.

A ball bearing 77 is accommodated in each of the ball accommodating parts 74a to 76a. In this case, since the width of each of the weights 74 to 76 is small, there is no need to provide assisting bearings as is in the second embodiment. Thus, each of the weights 74 to 76 is compact.

A size of the ball bearing 77 is selected so that a part of the ball bearing 77 protrudes from both the bottom surface and an outer circumferential surface of each of the weights 74 to 76. Accordingly, each of the weights 74 to 76 is movably supported by the three ball bearings 77. Additionally, the weights 74 to 76 are accommodated in the annular space 73 which is formed by the guide groove 72 of the turntable 6 and the flat portion 45a of the rotor 45. Thereby, the weights 74 to 76 are accommodated in the space 73 in a slidable state via the ball bearings 77.

Figure 18:
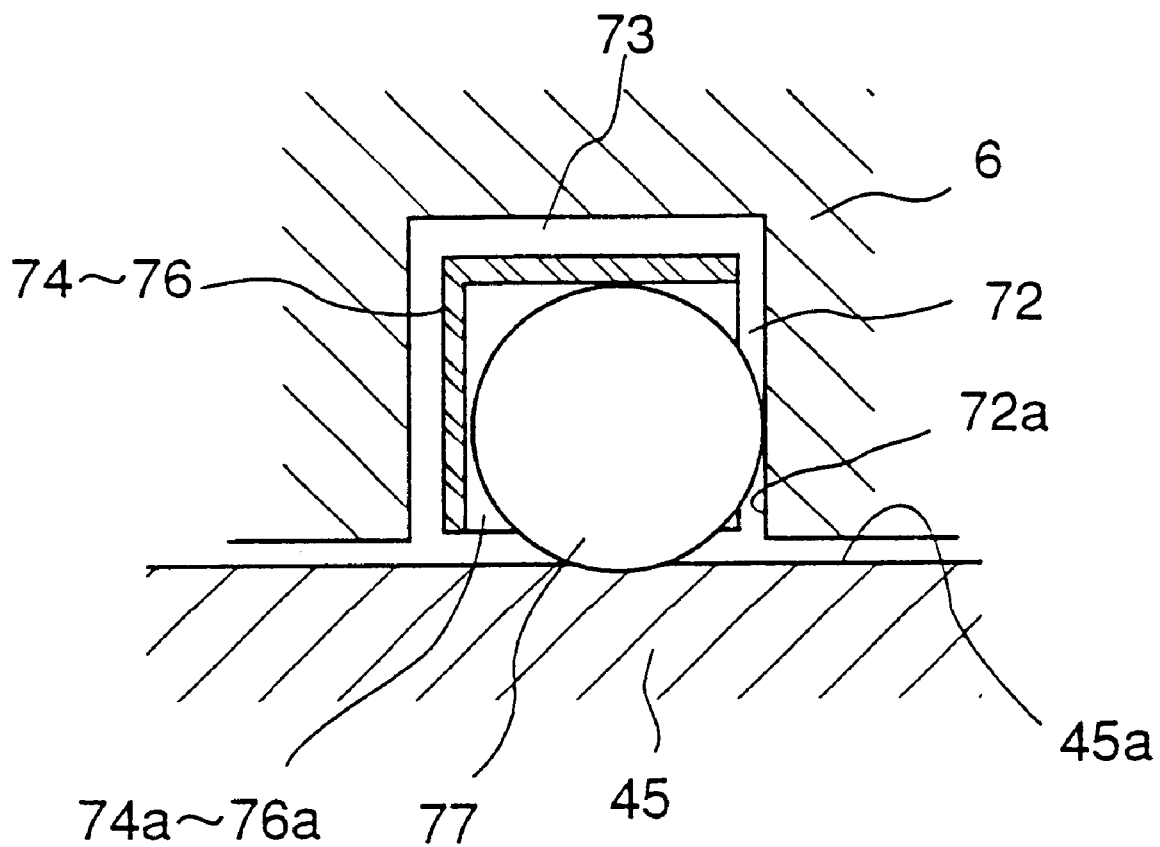
FIG. 18 is a cross sectional view of a part of a rotor shown in FIG. 17 in a state in which a weight is accommodated in a space formed in the rotor.

FIG. 18 is a cross-sectional view of the space 73 and the weights 74 to 76 accommodated in the space 73. As shown in FIG. 18, each of the weights 74 to 76 is accommodated in the space 73 in a state in which the ball bearings 77 contact the outer wall 72a of the guide groove 72 and the flat part 45a of the rotor 45. Accordingly, a friction of each of the weights 74 to 76 is reduced by the ball bearings 77.

When a vibration is generated in the rotor 45 in a radial direction, a force is exerted on the weights 74 to 76 to rotate the weights 74 to 76 in a circumferential direction. If the center of gravity of the rotor 45 is displaced from the center axis of the rotational shaft 41, the weights 74 to 76 move in a circumferential direction while being guided by the guide groove 72. At this time, since each of the weights 74 to 76 can move in the space 73 with a low friction due to the ball bearings 77, the weights 64 to 66 can quickly move in the circumferential direction when the vibration is generated. As a result, the center of gravity of the rotational member balances the center of gravity of the weights 74 to 76, and the center of gravity of the disc D, the turntable 6 and the rotor 45 apparently coincides with the center axis of the rotational shaft 41. Accordingly, the vibration generated in the rotational member (the disc D, the turntable 6 and the rotor 45) is suppressed as the weights 74 to 76 moves relative to the turntable 6 and the rotor 45. The vibration is stopped when the center of gravity of the weights 74 to 76 reaches a position 180 degrees opposite to the center of gravity of the rotational member.

Accordingly, when the rotor 45 vibrates, the weights 74 to 76 rotate to positions 180 degrees opposite to a direction of displacement of the center of gravity of the rotor 45. Thus, the displacement of the center of gravity is corrected so that the center of gravity of the rotor 45 coincides with the center axis of the rotational shaft 41. Accordingly, the vibration of the rotor 45 is suppressed, and the disc D, the turntable 6 and the rotor 45 are prevented from being vibrated. Thus, when data (information) recorded on the disc D is read at a high speed by increasing the rotational speed of the disc D to a speed twelve times or sixteenth times faster than the standard speed, a generation of vibration can be prevented even if a strength of the rotational shaft 41 of the turntable drive motor 29 or the supporting structure of the rotor 45 is decreased due to reduction in the thickness of the apparatus 1. For example, even when the center of gravity of the disc D is displaced due to a displacement of the center hole of the disc D or uneven distribution of printing ink on the disc D, the disk D and the turntable 6 can be rotated at a high speed. Additionally, it can be prevented that the information recorded on the disc D cannot be read due to a vibration of the disc D being transmitted to the pickup 5 via the turntable 6.

Accordingly, both the reduction in the thickness of the apparatus 1 and an increase in the reading speed can be achieved at the same time. Thus, information recorded on the disc D can be reliably read at a high speed even when the rotational speed of the disc D is increased to a speed twelve times or sixteenth times faster than the standard speed. Additionally, since the vibration of the disc D is suppressed by the rotation of the weights 74 to 76, the vibration is not transmitted to the base 42 which supports the motor 29. Thus, it can be prevented that an unpleasant feel is provided to the operator or a vibration noise is generated due to a vibration transmitted to a housing of a notebook-type personal computer.

In the vibration preventing mechanisms according to the above-mentioned embodiments, each of the weights 51 to 53, 64 to 66 or 74 to 77 has the same size. However, the present invention is not limited to such a structure, and a vibration suppressing effect may be changed by providing weights having different sizes.

It should be noted that the present invention is not limited to the above-mentioned CD-ROM drive unit, and can be applied to other disc-like recording medium such as a CD, a magnetic disc, a magnetooptical disc or an optical disc.

Additionally, in the above-mentioned embodiments, the vibration preventing mechanism is used for preventing a vibration generated in the motor for driving the turntable to which the disk is attached. However, the present invention is not limited to such a motor, and the vibration preventing mechanism may be applied to a motor for other applications.

The present invention is not limited to the specifically disclosed embodiments, and variations and modifications may be made without departing from the scope of the present invention.

The present application is based on Japanese priority application No.9-178372 filed on Jul. 3, 1997, the entire contents of which are hereby incorporated by reference.

What is claimed is:

1. A vibration preventing mechanism for a disc apparatus having a turntable on which a recording medium in the form of a disc is placed and a motor for rotating the turntable with said motor comprising a rotatable rotor having a rotor case in a shape substantially of a cup with a substantially flat top surface, a stator and a rotational shaft connected to said turntable;

a plurality of magnets connected to said rotor case facing said stator, said strator having a plurality of electromagnetic coils oppositely facing said plurality of magnets;

said turntable being spaced from said rotor case to form a confined space relative to said substantially flat top surface of said rotor case; and a plurality of weights disposed within said confined space between the top surface of said rotor case and said turntable in an arrangement with said weights spaced annually apart from one another with each of said weights being angularly displaceable in any circumferential direction of said rotor so as to cause a rotational annular displacement of said weights within said confined space relative to one another and to said rotor of up to a full 360° rotation of a rotor when a vibration is caused in the rotation of the turntable of high speed of rotation of said rotor.

2. The vibration preventing mechanism for a motor as claimed in claim 1, wherein said plurality of weights rotate about a rotational axis of said rotor.

3. The vibration preventing mechanism for a motor as claimed in claim 1, wherein said plurality of weights are movably provided in an annular space having a center coinciding with a rotational axis of said rotor.

4. The vibration preventing mechanism as claimed in claim 1, wherein said rotor includes a guide surface guiding movement of said plurality of weights.

5. The vibration preventing mechanism as claimed in claim 4, wherein each of said plurality of weights includes a plurality of balls which roll on said guide surface of said rotor.

6. A disc apparatus using a disc as a recording medium, said disc apparatus comprising:

a turntable on which said disc is attached;

a motor for rotating said turntable, said motor comprising a rotational rotor and a stator with the rotor having a rotor case with a substantially flat surface and including a rotational shaft coupled to said turntable and to said rotor case with said turntable having a recessed area at one end thereof adjacent to the flat surface of said rotor case; and a vibration preventing mechanism including a plurality of weights provided in said recessed area of said turntable adjacent the flat surface of said rotor case, each of said weights being freely displaceable in any circumferential direction of said rotor up to a full 360° rotation by a vibration caused in the rotation of the turntable by a rotation of said rotor at a high speed.

7. The disc apparatus as claimed in claim 6, wherein said plurality of weights rotate about a rotational axis of said rotor.

8. The disc apparatus as claimed in claim 6, wherein said plurality of weights are movably provided in an annular space having a center coinciding with a rotational axis of said rotor.

9. The disc apparatus as claimed in claim 6, wherein said rotor includes a guide surface guiding movement of said plurality of weights.

10. The disc apparatus as claimed in claim 9, wherein each of said plurality of weights includes a plurality of balls which roll on said guide surface of said rotor.

* * * * *